(12) United States Patent
Carter

(10) Patent No.: US 11,946,270 B2
(45) Date of Patent: Apr. 2, 2024

(54) TOILET HAVING COMPRESSED AIR FLUSHING TECHNOLOGY AND WATER EXTRACTING FROM HUMIDIFIED AIR

(71) Applicant: Vandette B. Carter, Yorktown Heights, NY (US)

(72) Inventor: Vandette B. Carter, Yorktown Heights, NY (US)

( * ) Notice: Subject to any disclaimer, the term of this patent is extended or adjusted under 35 U.S.C. 154(b) by 7 days.

(21) Appl. No.: 17/064,214

(22) Filed: Oct. 6, 2020

(65) Prior Publication Data

US 2021/0108401 A1 Apr. 15, 2021

Related U.S. Application Data

(60) Provisional application No. 62/911,372, filed on Oct. 6, 2019.

(51) Int. Cl.

| | | |
|---|---|---|
| *E04H 1/12* | (2006.01) | |
| *A47K 11/02* | (2006.01) | |
| *B61D 35/00* | (2006.01) | |
| *E03D 1/00* | (2006.01) | |
| *E03D 5/10* | (2006.01) | |
| *E03D 9/08* | (2006.01) | |

(52) U.S. Cl.
CPC ............ *E04H 1/1216* (2013.01); *A47K 11/02* (2013.01); *A47K 11/023* (2013.01); *B61D 35/005* (2013.01); *B61D 35/007* (2013.01); *E03D 1/00* (2013.01); *E03D 5/10* (2013.01); *E03D 9/08* (2013.01)

(58) Field of Classification Search
CPC .... E03D 1/00; E03D 3/10; E03D 5/10; E03D 9/08; B61D 35/005; B61D 35/007; A47K 11/02; E04H 1/1216

USPC ...................... 4/661, 316, 321, 476
See application file for complete search history.

(56) References Cited

U.S. PATENT DOCUMENTS

| | | | | |
|---|---|---|---|---|
| 4,346,002 A | * | 8/1982 | Petzinger | A47K 11/02 4/111.1 |
| 6,618,866 B1 | * | 9/2003 | Edmondson | E03D 5/00 4/321 |
| 9,737,181 B1 | * | 8/2017 | Hall | A47K 13/302 |
| 2010/0050330 A1 | * | 3/2010 | Earlywine | E03D 7/00 4/321 |
| 2014/0215702 A1 | * | 8/2014 | Ito | E03D 7/00 4/321 |

(Continued)

FOREIGN PATENT DOCUMENTS

| | | | | |
|---|---|---|---|---|
| EP | 2052940 A2 | * | 4/2009 | ........... B61D 35/007 |
| NO | 145890 B | * | 3/1982 | ............... E03D 3/10 |

*Primary Examiner* — Tuan N Nguyen
(74) *Attorney, Agent, or Firm* — Ohlandt, Greeley and Perle, LLP

(57) ABSTRACT

A stand-alone toilet system is powered by photovoltaic cells to operate a dehumidifier from which water is extracted from the atmosphere by dehumidification and used for flushing; an electronic compressor is situated in the toilet tank to compress air which is used with water in the flush cycle; a motorized or hydraulic hinge is utilized to open and close a toilet cover automatically which can be locked in place by an electromagnet securing mechanism to create an airtight seal in the closed position; a heating element and a UV lamp are situated inside the "treatment facility" of the toilet system to evaporate liquid and sanitize waste content therein respectively.

12 Claims, 15 Drawing Sheets

(56) References Cited

U.S. PATENT DOCUMENTS

| | | | |
|---|---|---|---|
| 2015/0164292 A1* | 6/2015 | Shin-Ya | A47K 11/026 |
| | | | 4/111.1 |
| 2017/0051486 A1* | 2/2017 | Schomburg | A47K 10/18 |
| 2017/0196418 A1* | 7/2017 | Ito | E04H 1/1216 |
| 2021/0059480 A1* | 3/2021 | Blevins | A47K 4/00 |

* cited by examiner

TOILET HAVING COMPRESSED AIR FLUSHING TECHNOLOGY AND WATER EXTRACTING FROM HUMIDIFIED AIR

This application claims priority from and the benefit of provisional patent application Ser. No. 62/911,372, filed on Oct. 6, 2019, which is incorporated herein by reference, in its their entirety, for all purposes.

BACKGROUND OF THE DISCLOSURE

1. Field of the Disclosure

The present disclosure relates to toilet systems. In particular it relates to self-contained, stand-alone toilet systems.

2. Description of the Related Art

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

"The Bill and Melinda Gates Foundation" (hereinafter the "Foundation") Water Sanitation & Hygiene (WSH) strategy overview highlights the following that exist in the developing world:

2.5 billion people, amounting to 40 percent of the world's population, use unsafe toilets or practice open defecation.

Conventional sanitation (a flush toilet connected to a centralized sewer system) is possible for only a small fraction of people in developing nations.

Every year, food and water tainted with fecal matter cause up to 2.5 billion cases of diarrhea among children under five, resulting in 1.5 million child deaths.

Chronic diarrhea can hinder child development by impeding the uptake of essential nutrients that are critical to the development of children's minds, bodies, and immune systems."

There have been several proposed toilet solutions resulting from the Foundation's WSH campaign held within the last decade; some inventions used no water, while others used recycled water extracted from sewage, urine or both. All of the systems proposed from around the world may prove to be too costly over the short and long term to manufacture or maintain, since either the toilet system or treatment facility components will require frequent maintenance, which may be beyond the capability or affordability of the people the technologies are intended to help. In nearly all featured novel toilets proposed as a result of the Foundations effort, a particle filter manufactured outside of a developing country will need to be bought and installed by a service person or a company in the developing country. This adds aftermarket cost, technical servicing and inconvenience to an already impoverished society.

In another example which also requires a filter and multistage waste discharge processing in a "treatment facility," an ionizing system is used to create chlorine radicals from table salt (NaCl), to sanitize the human waste. This novel "treatment facility" will require close monitoring, pH measurements, technical and chemical knowledge to maintain the sanitization process at optimal and effective level, to make the water safe to be reused for hygiene. The cost for parts and repair will likely be exorbitant for this complex system which has several components. The aforementioned technology also uses a conventional, off the shelf. "toilet facility" which is gravity flush dependent and uses copious amount of water (1.6 gallons or more per flush). The timeline to sanitize said amount of water using PV power supply alone, for multiple use/user in one day, is uncertain, and will likely require a large battery bank and power supply to operate reliably.

In countries lacking resources and capital, maintaining such systems as described will likely prove ineffective in the long term. Their cost have been assessed at tens of thousands of dollars in at least two disclosures.

In the developed world, toilets are ubiquitous and require no frequent maintenance or replacement before a decade of service.

Constructing a vast sanitation network of subterranean pipes in the developing world for potable water or sewer treatment, on par with a modern city, would be very costly and thus prohibitive. As such, an alternative, cost effective approach is needed for a "toilet system" that would be self-sufficient in every conceivable way.

There are many social, geographical and epidemiological issues that are associated with the use, or lack of use, of toilets in the developing world. Diarrhea caused by microbes has been identified as an endemic problem in the poorest region of the world, accounting for "1.5 million of deaths of children under the age of five" annually according to the Foundation's report. Though many alternative toilet sanitation solutions have been proposed, they all primarily depend on the force of gravity and an abundance of water to work, albeit on a smaller scale, whereby the most novel approaches recycle water or urine which takes a great deal of energy and time.

In a proposed prototype toilet sponsored by the Foundation, which uses an Archimedes screw system to transfer human waste into a built in incinerator; the combustion chamber requires onsite energy and must be emptied periodically. The combustion fumes factor therefrom have not been discussed or addressed in this proposed toilet technology, which will certainly be an issue for the user if not vented or filtered. As in many of the examples of toilet solutions intended for the developing world, a filter replacement of some kind is required, adding aftermarket cost in just a few months.

Moreover many of the toilets proposed by the Foundation's effort have a reported cost of approximately $50,000 USD or more, which is more than fifty times the cost of a "luxury toilet" in the developed world. It is evident that a cost effective toilet for the developing world, using current proposed solution are all unattainable and most are impractical for the developing world or the indigent population therein. As such, they are all more than a decade away from becoming affordable or practical. More than 15,000,000 five-year old children in the developing world will die, before any of the proposed toilet solutions will become a reality.

Modern toilet infrastructure paradoxically relies on a wasteful large quantity of drinkable water to operate, while the developing world often lacks potable water. Just a few decades ago, as much as eight gallons of water was required to flush a toilet, with more "efficient" models now still requiring at least eight liters of water to flush. It is not uncommon for a toilet to require repeated flushing, thereby multiplying the need for additional water usage in a conventional toilet, which can surpass eight gallons.

Though gravity dependent toilet system has proven to be very successful in the developed world, it is not the most practical technology for the developing world for a number of reasons: it is cost prohibitive to channel via a network of pipes and treat the sewage waste discharge in a large central treatment infrastructure/processing plant; a large volume of water is required to move the waste along hundreds of miles by gravity; potable water is often in shortage in the developing world and not a luxury to be used for toilet flushing.

In some parts of the developed world, such as suburban areas, a septic tank toilet system is common place and requires pumping out of 1000 gallons or more of sewage at least twice a year. More than two thirds of this waste is water that can potentially pose a health hazard if the septic system breaks and leak into well water. It is obvious that water in any toilet system sewage is a medium for germ transmission. As such, it must be dealt with effectively for a practical toilet system for the developing world.

In the developing world, rudimentary toilet pits that require periodic emptying (often done by hand) are prevalent and so is the practice of "open defecation." Untreated fecal waste from any source is a "petri dish" for bacteria and intestinal parasites to thrive in, causing life threatening diarrhea and premature deaths when the contaminated (untreated) sewage enters drinking water reserve, via rivers, streams and wells, either actively or passively. Bacteria spores can survive for extended period of time, beyond one year, outside of a host or in water, thereby propagating an ongoing threat of dysentery. It is therefore an objective of this disclosure to eradicate dysentery and premature deaths at its source, in the similar way that Dr. Jonas Salk invented the vaccine that eradicated polio.

SUMMARY OF THE DISCLOSURE

It is therefore an objective for the apparatus disclosed herein to create a toilet system that is easy to operate and be maintenance free for several years, which is best achieved by having very few moving parts, which would not require replacement within five years or longer.

It is a further objective to provide a toilet system that is not cost prohibitive and to have a price point between $1,000 and $5,000 USD for a complete unit, which can be used by four to ten people in a community, thereby becoming affordable for the majority of household or "refugee camps," in every developing country or impoverished community.

To achieve said desired objectives, a "stand alone" toilet system, defined as a "toilet facility" and "treatment facility" is disclosed, which does not use gravity, contaminated water recycling or a hopper assisted flushing apparatus, such as described in the prior art, to move fecal and urinal waste out of a toilet bowl.

Such a leapfrog toilet system would not only be able to generate its own water for hygiene and flushing, but also perform treatment of sewage onsite automatically, cost efficiently and effectively. The invention has achieved these objectives and more, by providing a surplus of water from dehumidification which can be used for laundry and agriculture.

A new and improved transformative toilet system is disclosed which does not require large volume of water to flush human waste into an onsite "treatment facility." Though water is not required to flush the toilet, but for hand washing, water is therefore acquired by a novel approach; specifically condensation of humid atmospheric air.

The toilet system utilizes positive pressure flush technology within the toilet facility, to force excreted waste from within the toilet bowl, overcoming gravity and into an onsite external "treatment facility" receptacle for sanitization. In another embodiment, negative pressure generated by the treatment facility is used to transfer waste from the "toilet facility" to the "treatment facility."

One clear solution or pathway to eradicate diarrhea associated intestinal illnesses in the developing world is to implement an affordable toilet system that reduces its dependency on potable water and can treat fecal waste onsite, cost effectively, and safely. This objective has been achieved in the invention as disclosed.

It is therefore more economical and practical to leapfrog the toilet technology and sanitation requirement for the developing world by using pressurized air and very little (typically less than 250 cc) or no water to flush a toilet. It is also practical to treat sewage onsite using novel approaches such as phase changing water/urine from liquid to a vapor quite readily, depriving pathogens of water to reproduce and survive.

Under a calibrated pressure setting of at least two to three atmospheres within a sealed toilet bowl, a successful flush from the "toilet facility" to the "treatment facility" can be achieved. To facilitate the movement of waste matter from the "toilet facility," the embodiments disclosed herein extract water from condensation/dehumidification of atmospheric air; a process that is capable of producing more than 10,000 cc of water daily in many regions of the planet having humidity ranging between 45-75% annually.

To facilitate flushing without the use of water and less energy, the inner surface of the toilet bowl and sewer pipes can be coated with a hydrophobic material to facilitate the movement of waste matter to the treatment facility with minimal amount of friction. A suitable material is trademarked under the brand Teflon®

The average humidity in various parts of South-East Asia, South America, Africa and countries located below the Tropic of Cancer and above Tropic of Capricorn, is optimum. Therefore there is an abundance of water in their atmosphere, and abundant sunshine in the countries closest and around to the equator, making PV use ideal. It is ironic that the areas on the globe most affected with poor sanitation and access to fresh water, have always had a plentiful supply of energy from the sun and potable water present in abundance in the atmosphere. A toilet system should utilize these available resources, to fulfill its purpose in the most cost effective way. Here again the present disclosure achieves this objective in an energy efficient and environmentally neutral manner.

As noted, water is the medium for bacteria to spread and proliferate. Therefore by removing or minimizing the amount of water from the treatment facility, an effective means to annihilate microbes is realized, as bacteria and other parasites do need water to survive. Other effective and well-tested methods to eradicate pathogens using ultraviolet light, are well known, and can be utilized in the treatment facility, and powered by solar generated electricity.

Oils from botanicals having very effective antibacterial properties, as disclosed in the Journal of Applied Microbiology 200,88,308-316, can also be used in the treatment facility once studied, standardized and quantified for this particular application. Diarrhea causing pathogens have been well studied and neutralized using the oil from certain plants, which have been observed and discussed in the journal of Applied Microbiology.

Altering the pH of the fecal waste can also have antimicrobial effect. This can be achieved by adding baking soda to the treatment facility to make the sewage alkaline or hydrochloric acid to make it acidic.

Isoprophyl alcohol of 70% or greater, can also be entertained to be introduced into the treatment facility in a measured manner, and the same can be done with a appropriate amount of bleach (for example, one gallon), which can be added into the treatment facility monthly or quarterly. In developing countries bleach (NaClO) is relatively inexpensive and it is possible to make it by ionizing table salt on an industrial scale suitable for the developing world.

There are numerous and effective methods to neutralize fecal waste prior to disposal on land, rivers, or to be reused as fertilizer. Water evaporation and exposure to ultraviolet light of the fecal waste would be adequate to sanitize waste matter in the preferred and ideal embodiment disclosed herein, as no external additive are required and the energy required for sanitization is derived directly from solar power—directly or indirectly.

BRIEF DESCRIPTION OF THE DRAWING

A component or a feature that is common to more than one drawing is indicated with the same reference number in each of the drawings.

DESCRIPTION OF THE EMBODIMENTS

A new and improved toilet system is disclosed, preferably as a portable embodiment having a foldable set of solar panels situated on its roof to generate electricity, which is then used to extract water from the atmosphere using a dehumidifier for water condensation and to operate an air compressor for flushing. The toilet is flushed with a mixture of compressed air and water, both acquired from the atmosphere and not plumbing infrastructure. Sewage treatment is achieved using UV light from a light source and thermal radiation which evaporates water/liquid on site.

The toilet bowl discharge line may be constructed as a new "J" trap configuration in order to facilitate the expulsion of human waste from the "toilet facility" and into the "treatment facility" against gravity. Water can be added to the bottom of the "J" trap to create a seal.

A conventional "S" trap configuration can also be used if the "treatment facility" it takes the form of septic tank or connected to a main sewer line (in limited cases) that is dependent on gravity, without departing from the main objectives and features of the invention.

Figure 10:
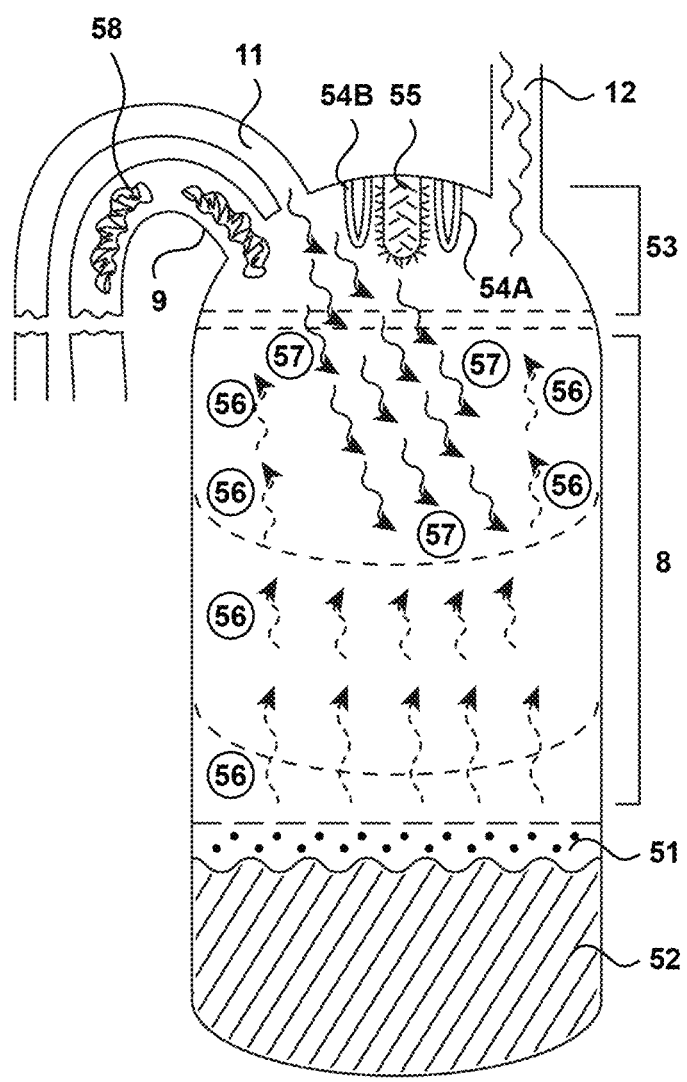
FIG. 10 depicts an inside view of the treatment facility.

The treatment facility is preferably a recycled oil steel drum (barrel) having a volume of approximately 218 liters, which is then coupled to a dome shaped component 53, of a cylindrical container 8 of FIG. 10, which houses the ultraviolet light and heating element. A customized steel drum of any size or one made of any metal or combination of metals or non-metals such as ABS plastic capable of withstanding 150 deg C. or more for everyday use. The two components 8 and 53 may be separated from each other as defined in 53 and 8 respectively, in FIG. 10.

Figure 7:
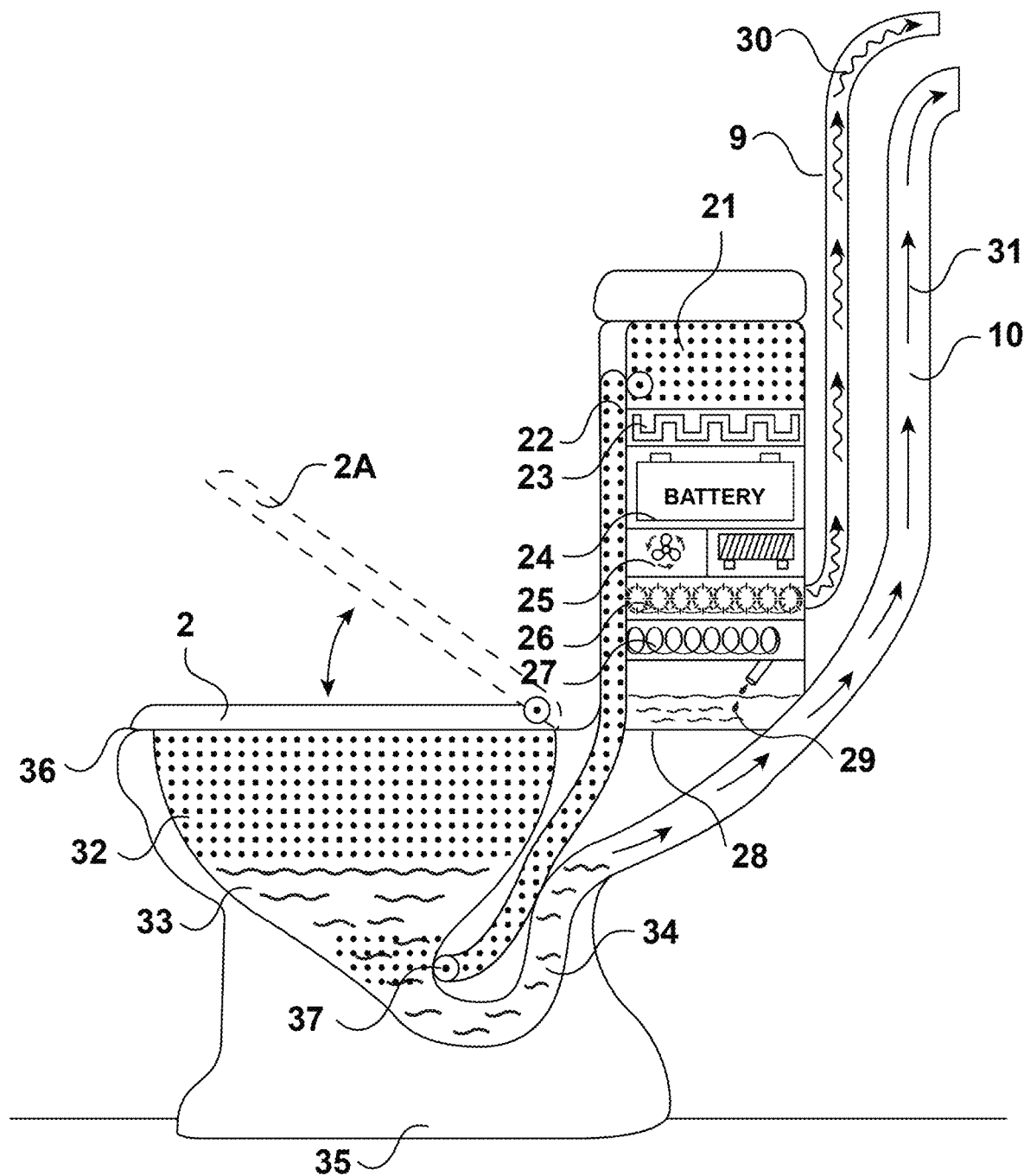
FIG. 7 is cross sectional view of the toilet facility depicting a tank and toilet bowl interconnected.
Figure 15:
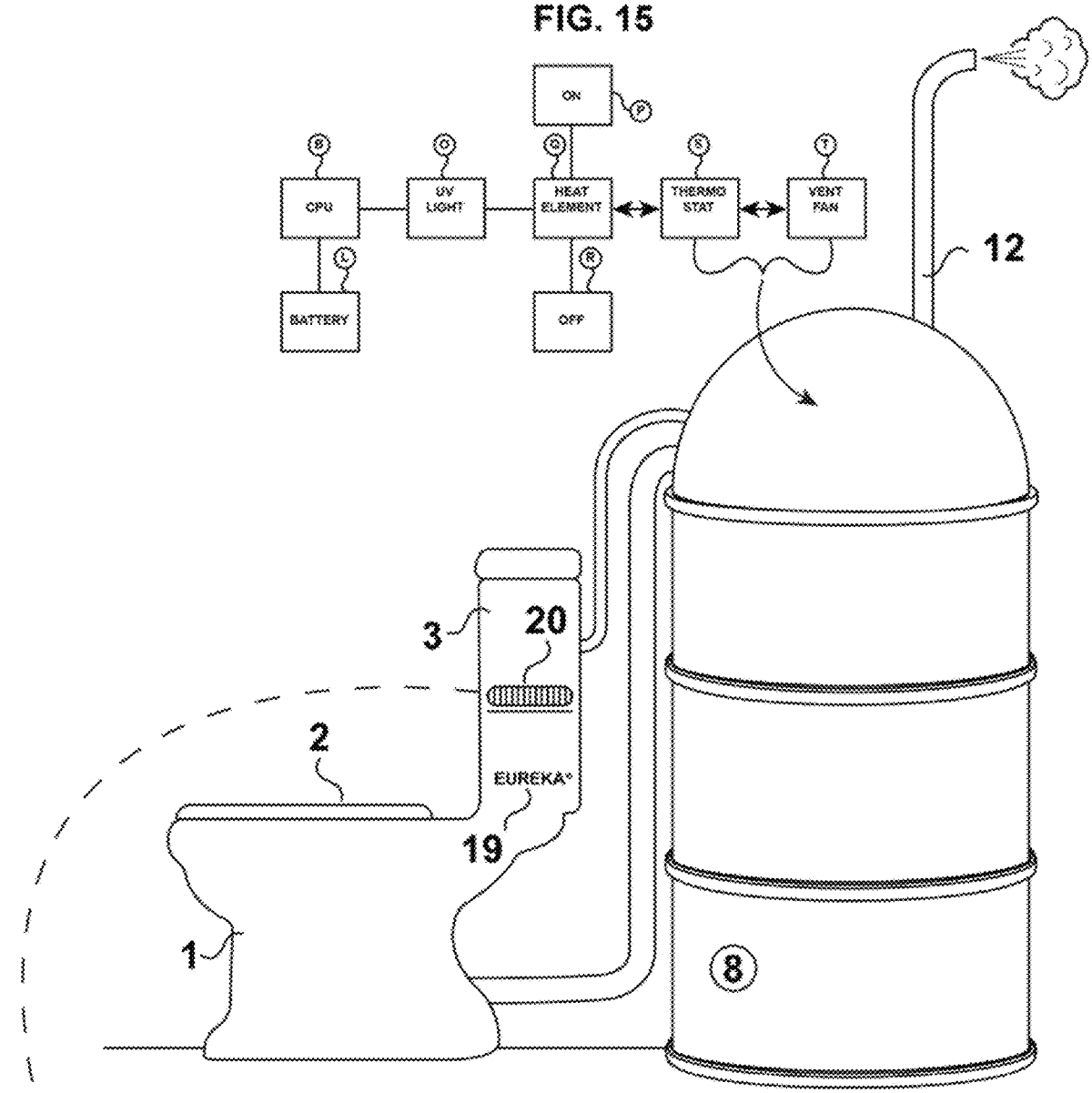
FIG. 15 is a logic block diagram of the "toilet facility" flush mechanics and "treatment facility" sterilization methods, using light UV light waves and thermal radiation.
Figure 15:
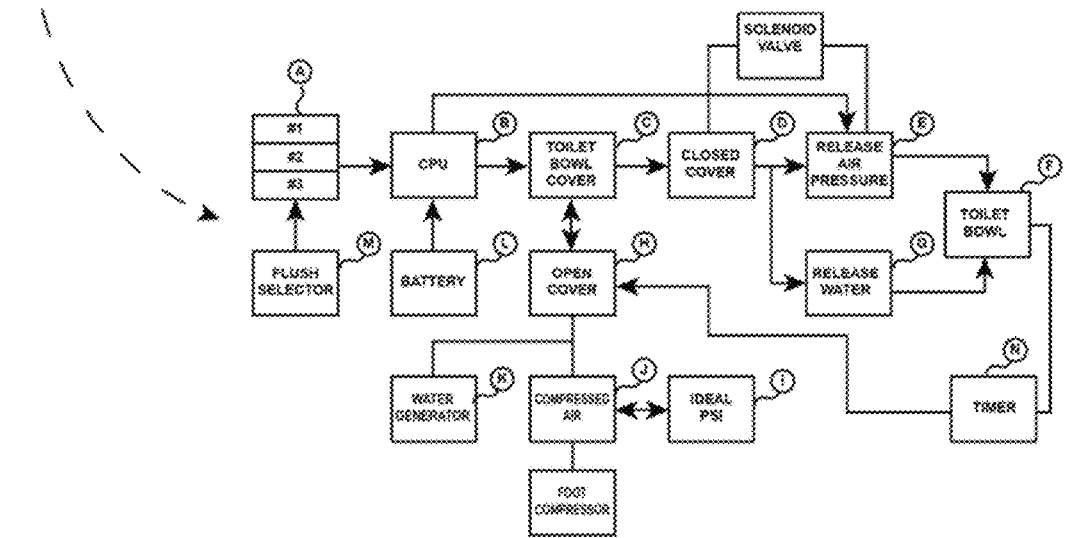

With specific reference to FIG. 7 and FIG. 15, it is apparent that the toilet facility is a unique toilet system, having a toilet bowl with an articulating transparent cover, which serves the primary purpose of creating a seal over the opening of the toilet bowl, so that pressurized air can be received therein, which then cause the expulsion of human waste from the toilet bowl by displacement, then transferred into the "treatment facility" by overcoming gravity.

The inner surface of the toilet bowl and conduit can all be coated with a hydrophobic material such as tetrafluorethylene (Teflon®) to reduce friction significantly and to use less energy. As air is compressed into a small space, its pressure increases in an inverse manner with respect to the volume. When air under pressure is released rapidly, the force exerted can be calibrated as desired, for example, by adjusting the aperture of a solenoid valve to achieve the desired results to flush liquid or solid waste into the "treatment facility".

The toilet cover is preferably locked into its closed position by a solenoid (electromagnet) securing mechanism. The articulation of the toilet cover can be achieved by an electric motor or hydraulic means, a feat that can be realized by mechanical engineers or those skilled in the art.

A CPU is incorporated to control the timely operation and fluidity of the toilet system so as to avoid the inadvertent discharge of compressed air when the cover is not secured. An electronic relay can fulfill said task by only permitting flushing when the toilet cover is in the closed and locked position. The toilet cover may also may also be manually operated by being suspended on a hinge or removable; locked in a closed position using screws which can either secure the cover from the topside or sides (not shown).

Figure 1:
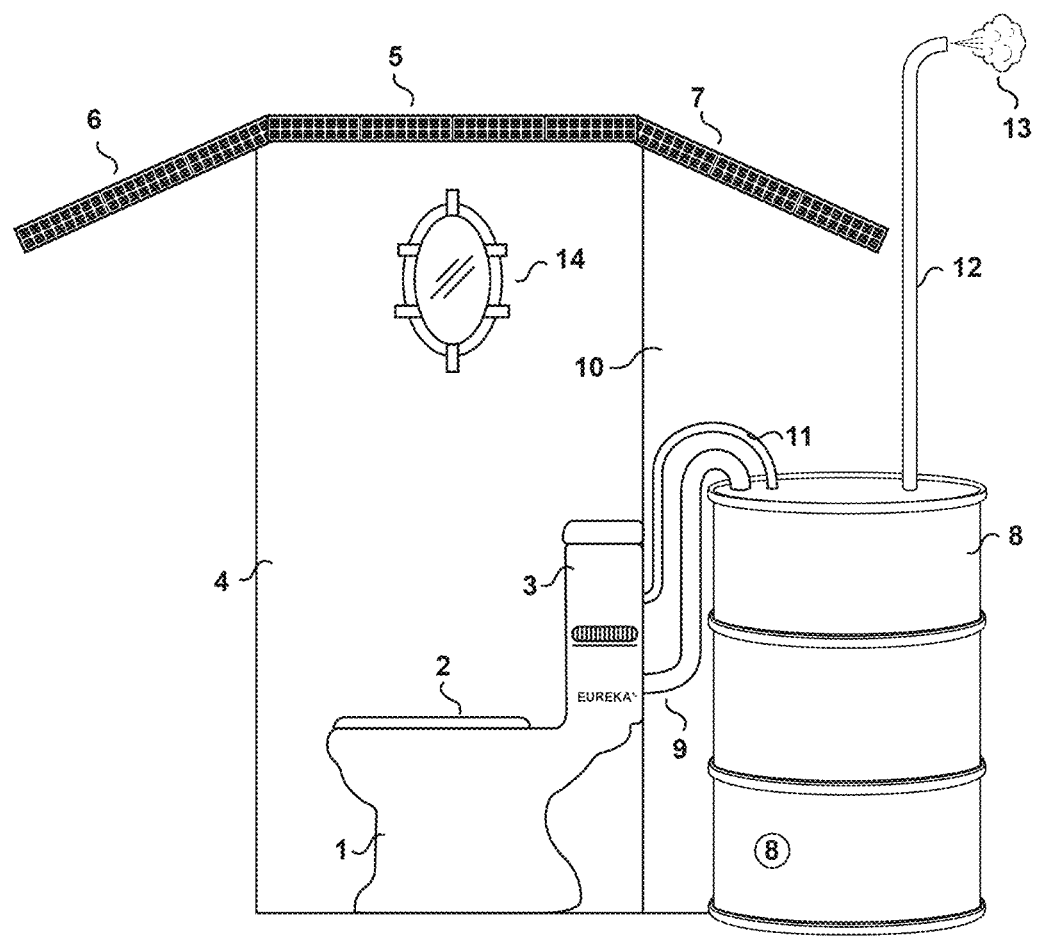
FIG. 1 is a cross sectional view of the toilet system as a portable embodiment.

Referencing FIG. 1, a cut away side view of the portable lavatory is shown whereby a new and improved compressed air actuated toilet (1-3) is shown inside of the lavatory cubicle 4. An array of solar unfolded panels 5, 6 and 7 are situated at the top of the lavatory for maximum sunray exposure. A "treatment facility" 8 is shown behind the toilet with receiving connecting plumbing from the toilet shown as 9 and 11.

Figure 2:
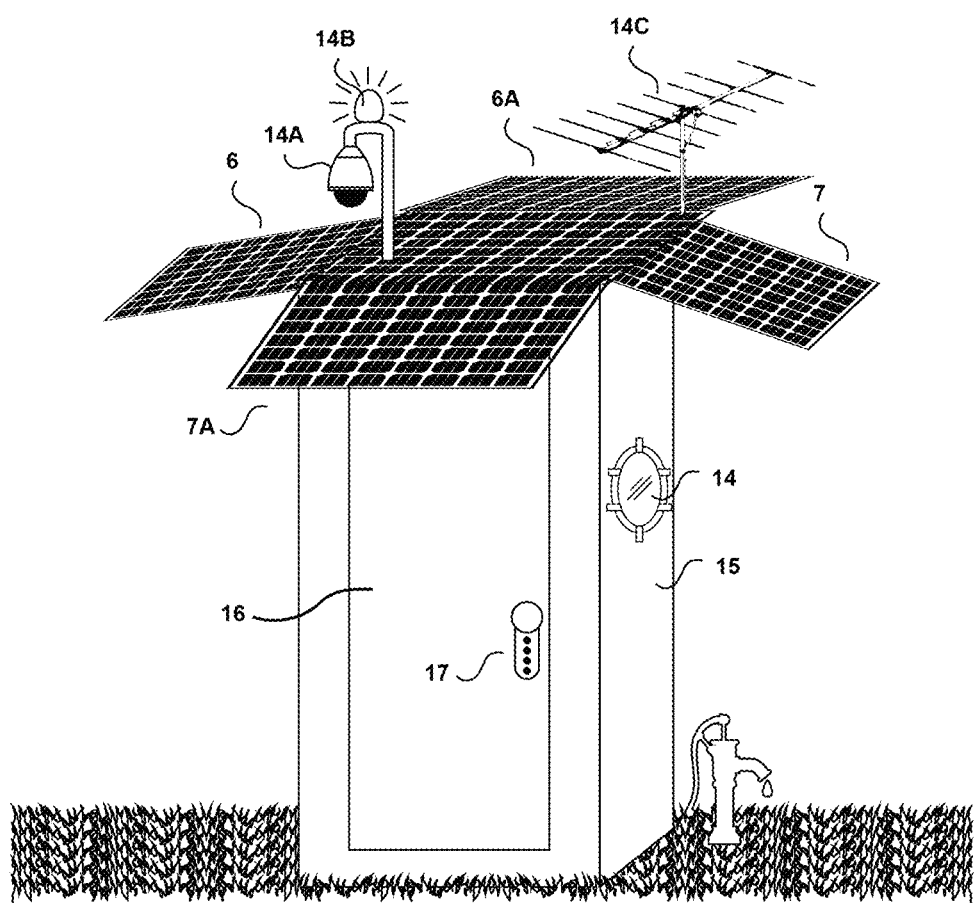
FIG. 2 is an external view of the toilet system, showing foldable solar panels, camera and antenna.

FIG. 2, is an external view of the portable toilet system having a door 16, unfolded solar panels 6 and 7 and, security camera 14A, a light bulb 14B and antennae 14C for sending and receiving wireless data/instructions to and from the toilet system using a cellular or satellite communication network.

Figure 3:
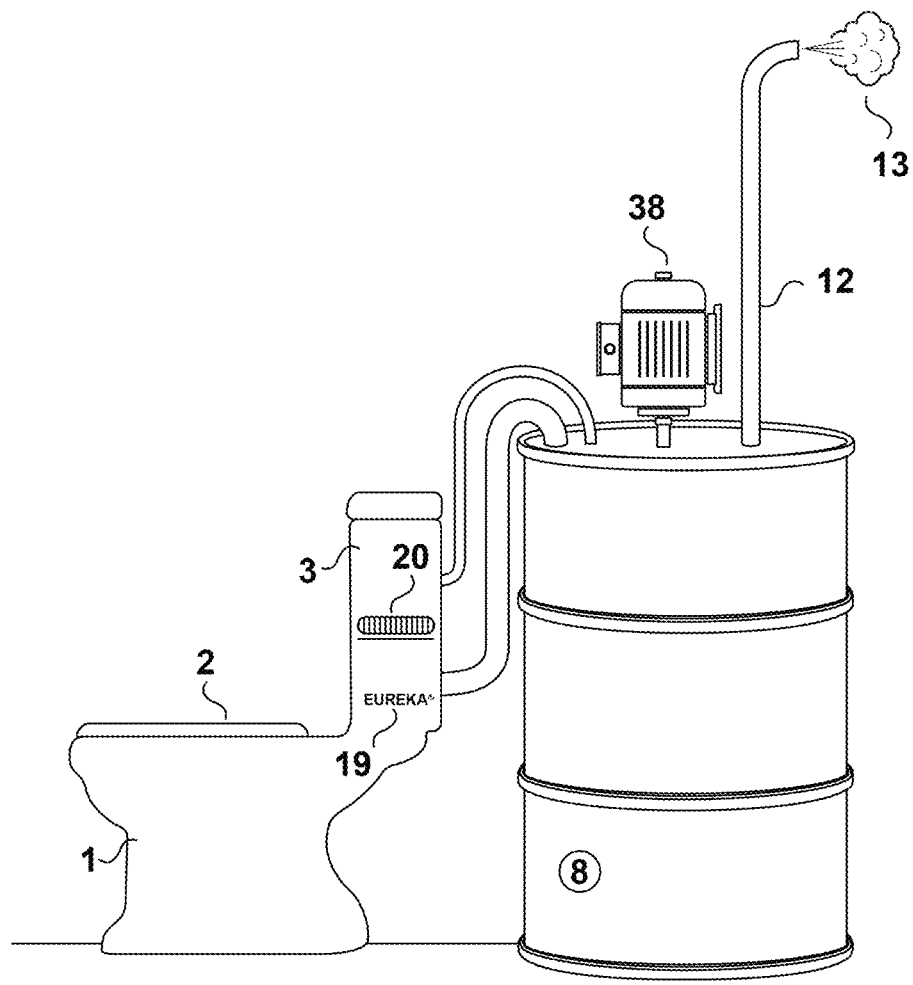
FIG. 3 is the toilet system with a vacuum pump, 38 to generate negative pressure in the treatment facility.

Referencing FIG. 3, a high flow vacuum pump is provided to create a negative pressure effect in the "treatment facility." As an alternate mode of operation, negative and positive pressure can be employed synergistically or individually, to move waste from the toilet bowl and into the "treatment facility" with or without the use of a toilet bowl cover to create a seal.

Figure 4:
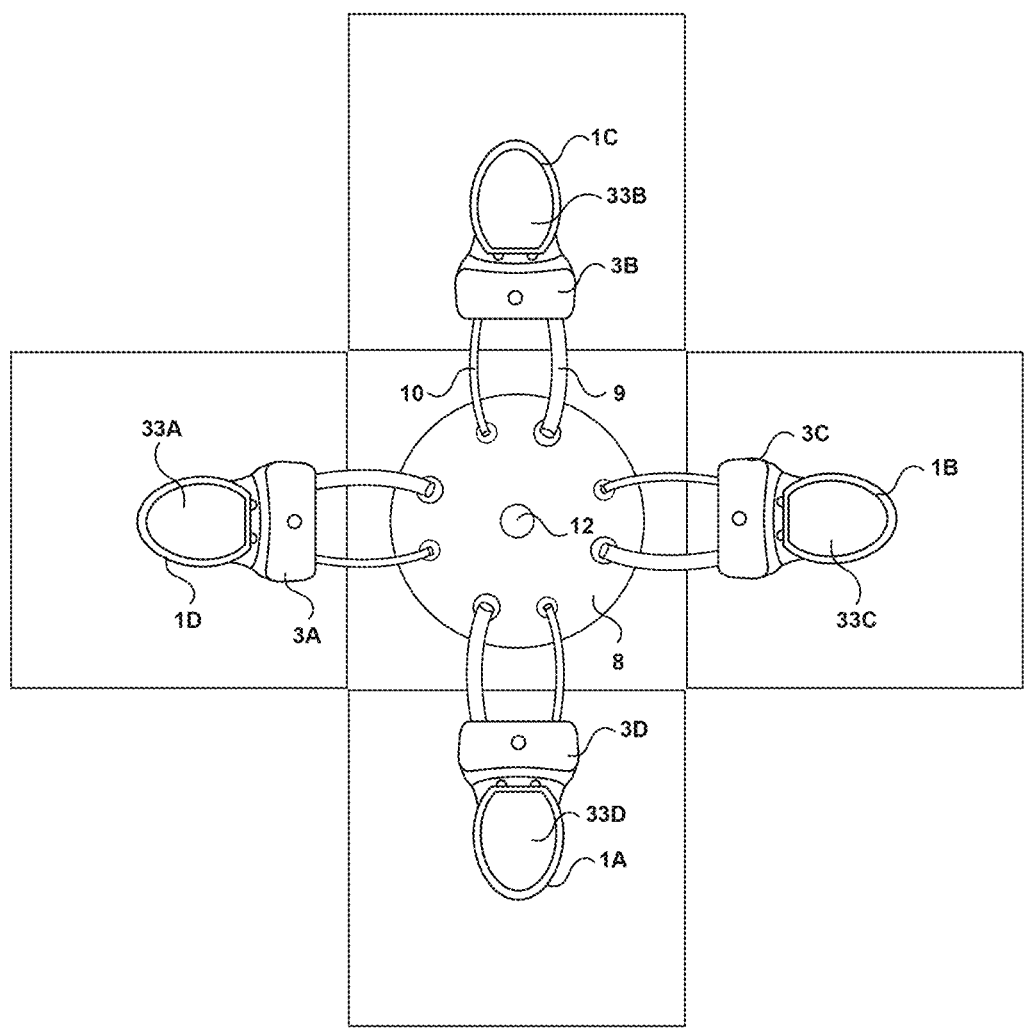
FIG. 4 is a top view of four portable toilets utilizing one treatment facility.

FIG. 4 is a top view of an array of four lavatories ("toilet facility"), utilizing one "treatment facility." This configuration is practical for a large outdoor public event, in the developed world, as well as for use in a community whereby a large population of people are dwelling, for example a refugee camp or squatter's community. Such an arrangement can reduce cost by more than 30%. As such the "treatment facility will need to be emptied at more frequent intervals, but less likely before a 12 month period.

Figure 5:
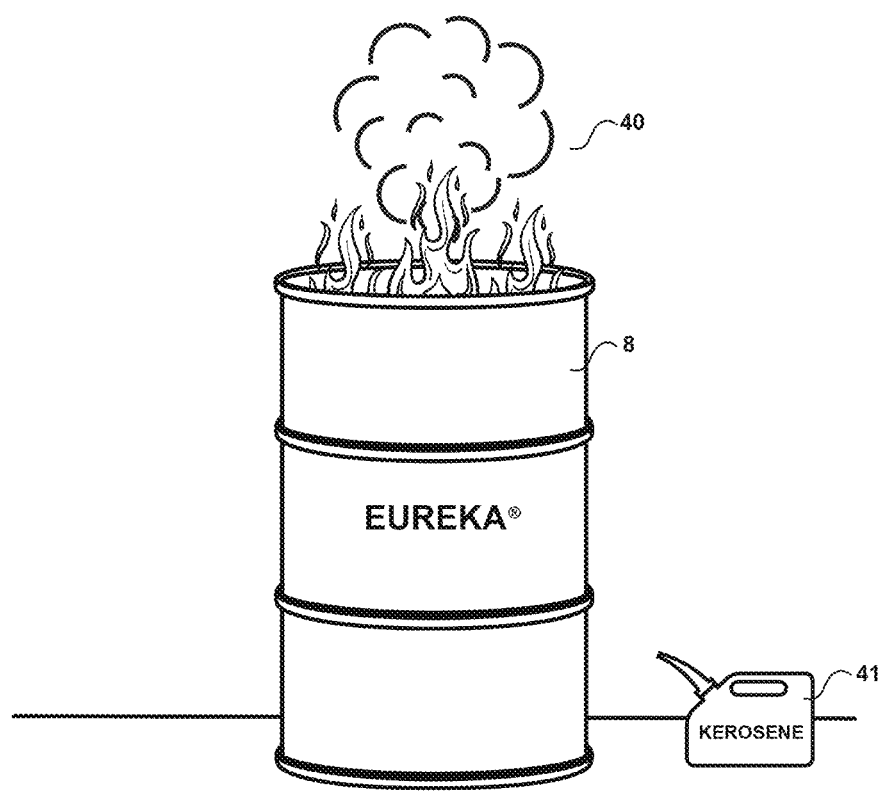
FIG. 5 depicts the "treatment facility" disposing of the fecal content by incineration.

FIG. 5 is a depiction of the "Treatment facility" with the cover removed to facilitate open burning—incineration of fecal waste within the receptacle. An accelerate such as gasoline or Kerosene can be used to ensure efficient combustion. The fecal waste may be saturated for several hours with at least one liter of an accelerant before combusting. The end product will be ash which might be useful for fertilizer for its carbon content.

Figure 6:
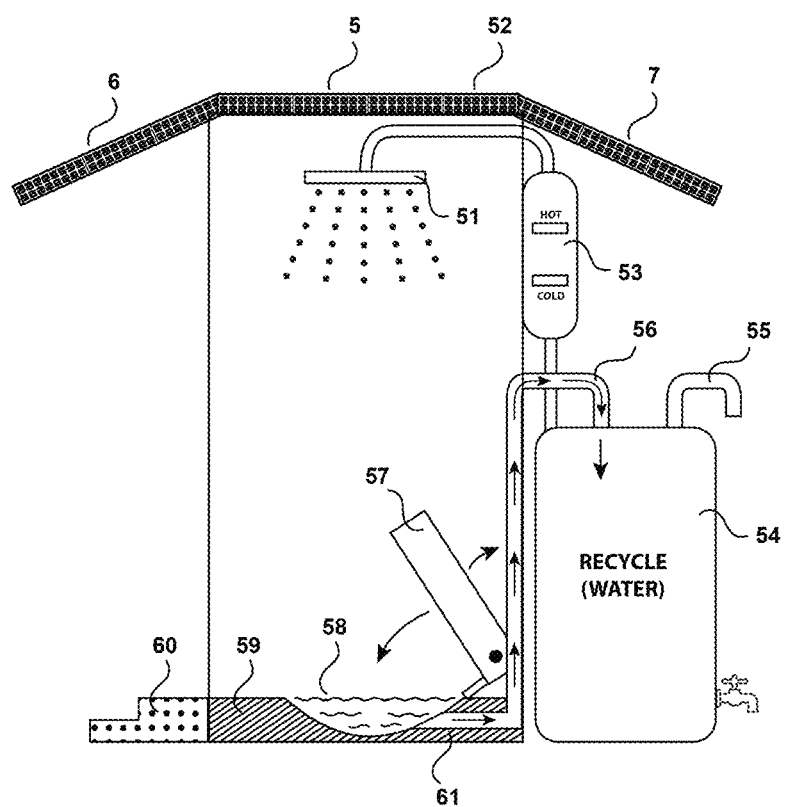
FIG. 6 is an alternate embodiment of the technology being applied as a portable shower stall.

FIG. 6 is an alternate embodiment of the apparatus being utilized as a portable shower stall. An elevated platform is situated within 59 to allow for water to collect via a receptacle 61, via sieves 58. An articulating cover 57 may be in an opened or closed position, before and after use, to discharge water from the receptacle 61, into a collecting container 54, which may be used for agricultural or washing. In this arrangement, the hot air may be used to heat water before use by using an electrical heating element. An overhead showerhead is shown, 51, as well as solar panels 5, 6 and 7.

FIG. 7 is a cross-sectional view of the toilet facility, comprised of the toilet bowl and tank. Within the toilet tank, a dehumidifier is integrated so as to acquire water from the atmosphere by condensation 29. A dehumidifier compressor and fan is shown as 25 and a "hot" and "cold" coil 26 and 27, respectively for phase change of refrigerant are represented. Heat 30 from the hot coil 26 is channeled the treatment facility via a conduit 9. An air compressor 23 and compressed air storage reservoir 21 is preferably situated at the top of the toilet tank. As described below with respect to FIG. 15, a CPU and other electronic controlled units are ideally situated above the compressed air reservoir 21 and powered by the battery 24. The toilet bowl 36 has an articulating cover 2 and 2A which forms an airtight seal when closed and locked by a solenoid lock mechanism (not shown). During a flush cycle, compressed air and water enter the toilet bowl at 37 (any design or location can be implemented for maximum efficiency). Air expansion 32 occurs above the water seal 34, causing displacement of all content 33 and 34 into the treatment facility via 10 and 31.

Figure 8:
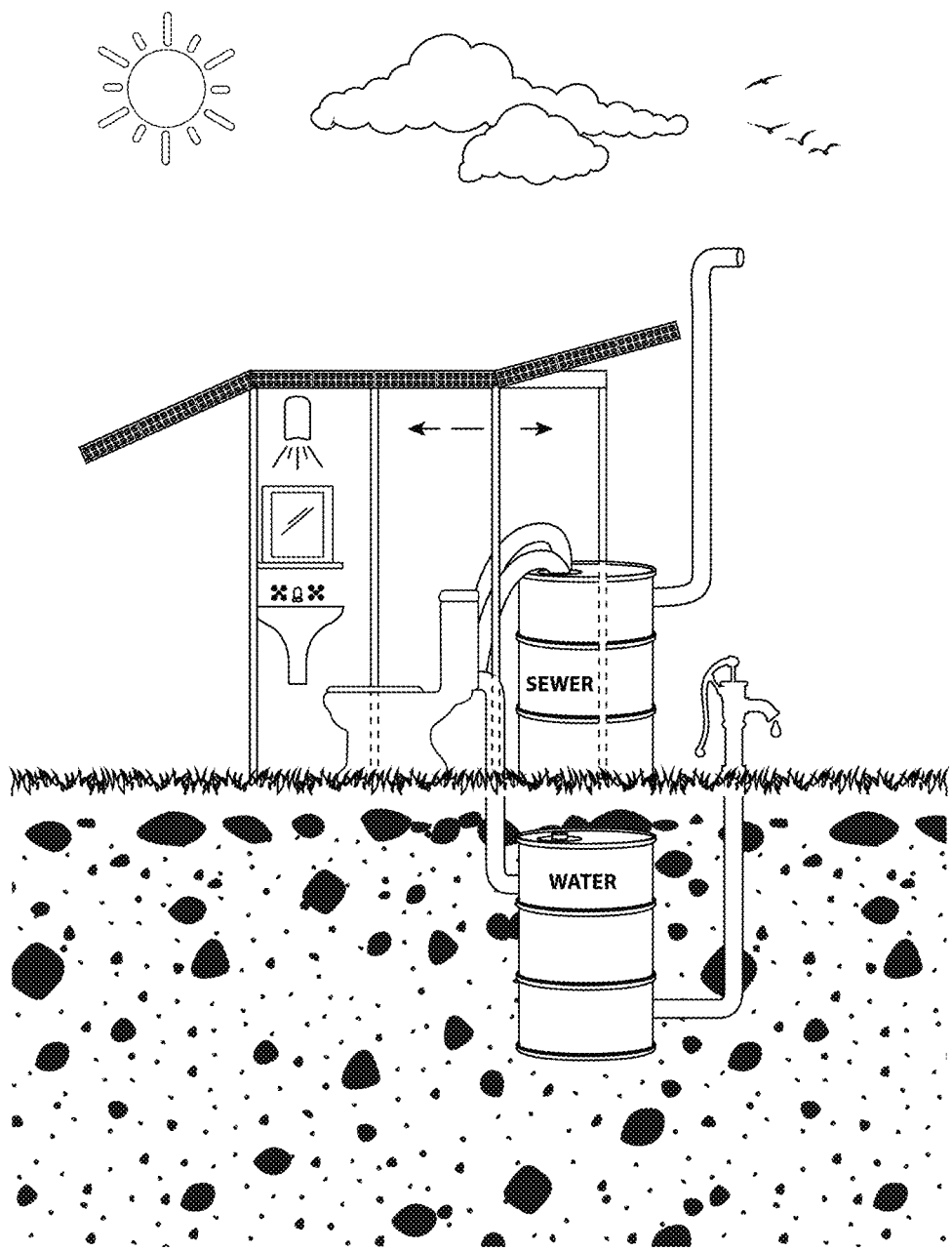
FIG. 8 illustrates a cross sectional view of the portable toilet system, having a subterranean water storage means.

As depicted in FIG. 8, a subterranean reservoir is shown, connected to an inexpensive 17th Century hand operated water pump device. As water is generated from condensation/dehumidification, excess water is made to overflow by gravity into the underground containment. The underground chamber can be single or multiple, preferably interconnected with each other, to store large volume of water to be used for washing, bathing, agriculture etc. Said water may also be used for hand washing and hygiene, operated by a mechanical foot pump or small electrical water pump.

Figure 9:
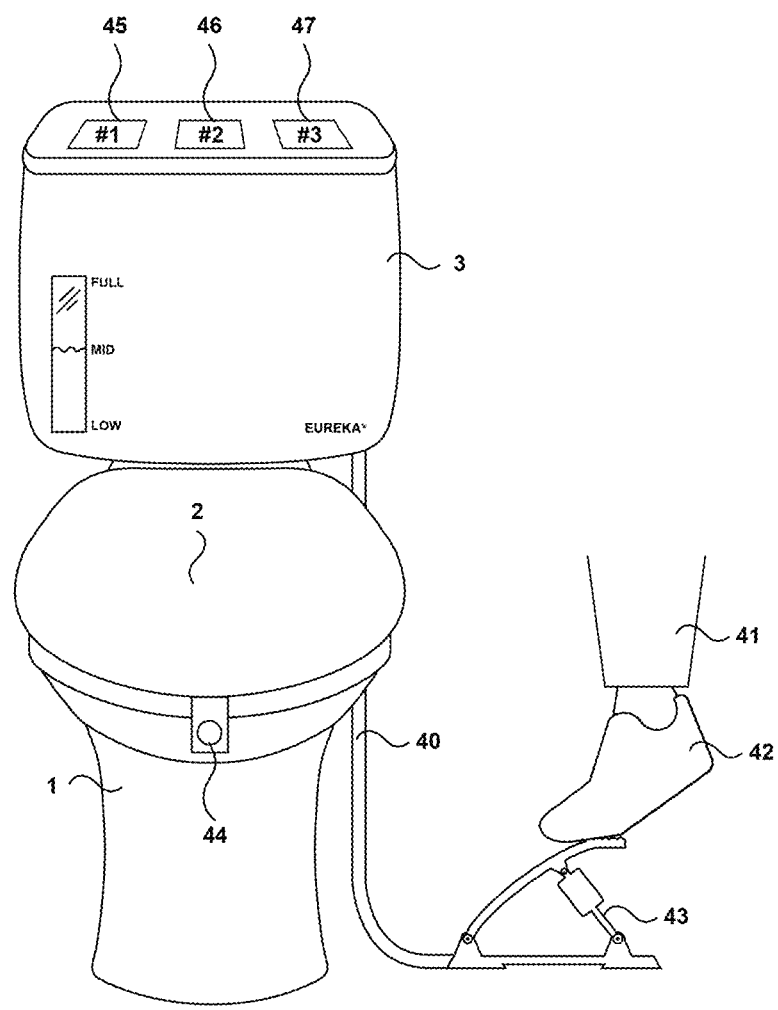
FIG. 9 demonstrates the toilet facility being operated by a foot pump to generate pressure (compressed air).

FIG. 9 is a frontal external view of a mechanically operated embodiment of the invention, which shows the toilet cover in a locked position by solenoid 44. A mechanical foot actuated air compressor 43 is depicted with compressed air channeled to the air reservoir located within the tank, via conduit 40. Flushing modes 45, 46 and 47 are located at the top of the toilet tank, and a transparent window is located at the front to show the level of water within the tank.

FIG. 10 is a cross section of the "treatment facility" having a conduit 9 to direct solid waste 52 and liquid waste 58 from the toilet facility which falls to the bottom of the receptacle 8 by gravity. Liquid in the form or urine and water is displaced to the top of the solid waste 52 and evaporates 56 when heated by hot air 57 from the inlet conduit 11 and heating elements 54A and 54B located in the removable dome 53. A UV lamp 55 is also ideally located in said dome to provide radiation using wavelength of light that is below 400 nm, to sterilize the content of the "treatment facility" when powered by electricity. Evaporation of the liquid 56 is channeled out of the receptacle via, exhaust pipe 12.

Figure 11:
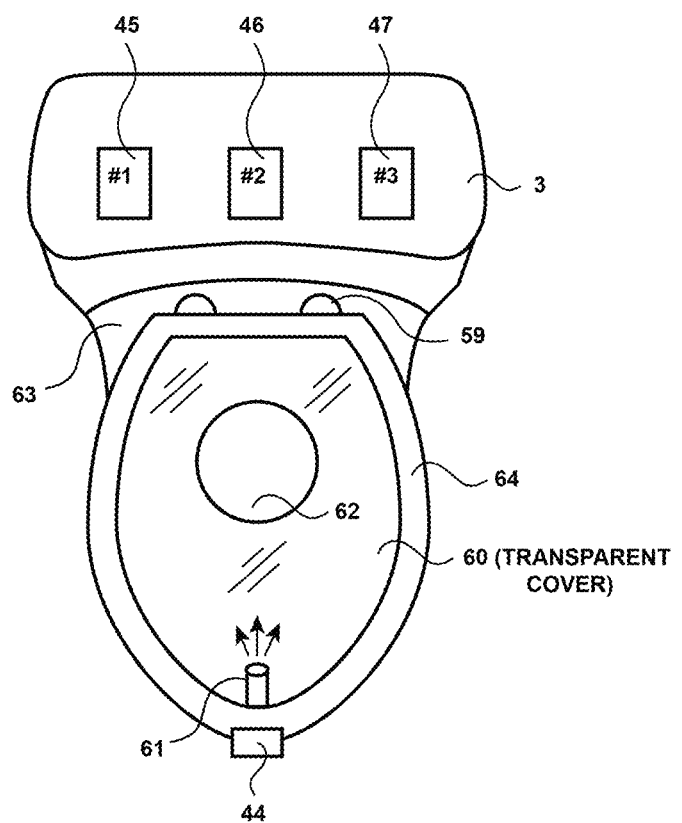
FIG. 11 is a top view of the toilet facility having a transparent cover of the toilet bowl in a closed position.

FIG. 11 is a top view of the toilet facility showing a transparent toilet bowl cover 60, articulating hinges 59, bidet 61, solenoid lock mechanism 44 and control flush options, 45, 46 and 47 located at the top of the toilet tank.

Figure 12:
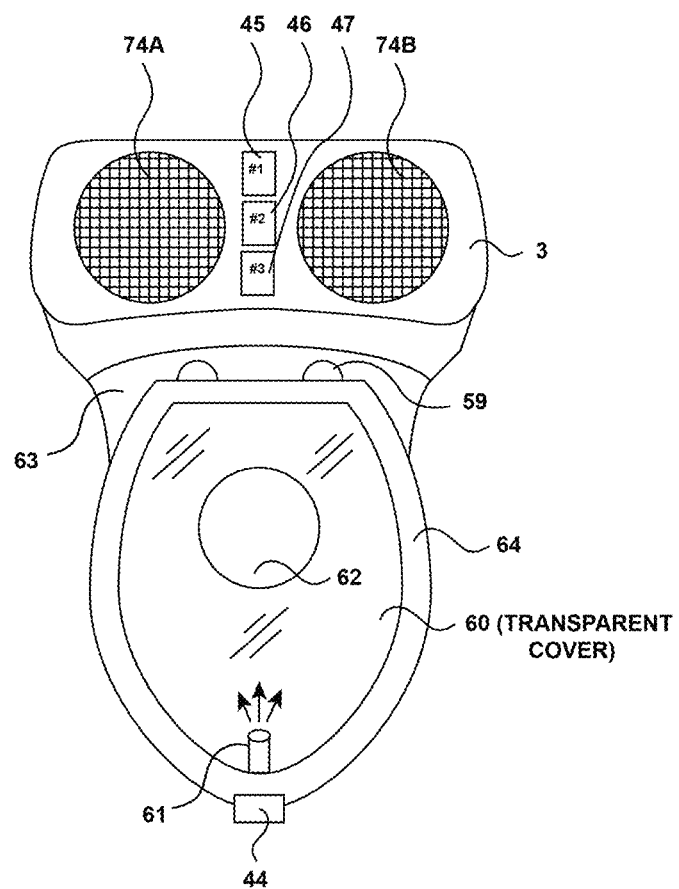
FIG. 12 is a top view of FIG. 13 toilet facility embodiment, having air intake grills integrated into the tank.
Figure 13:
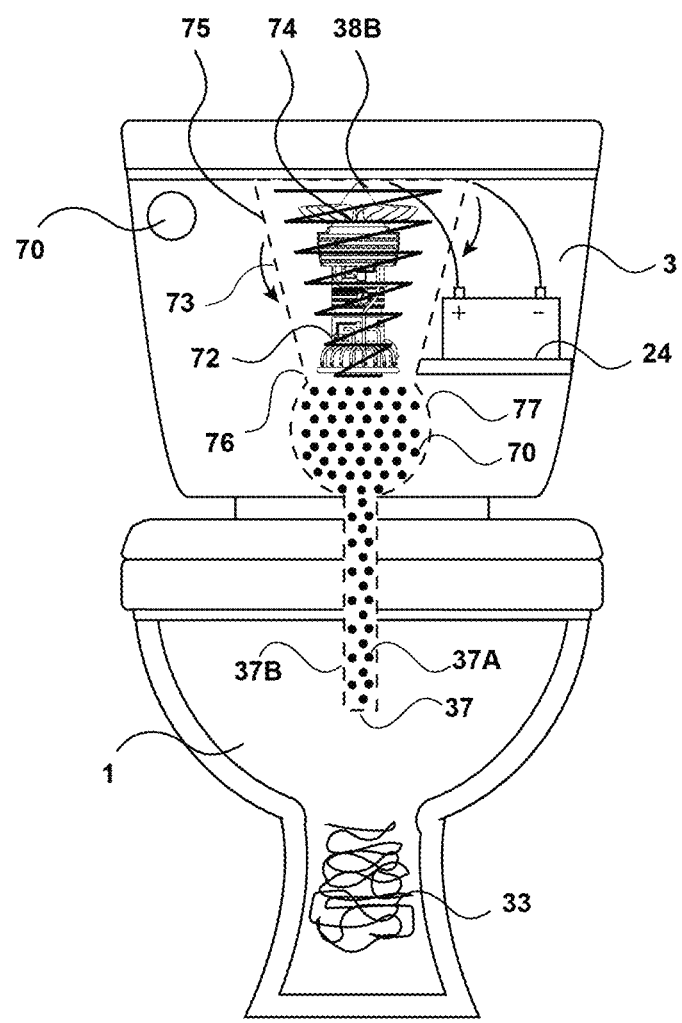
FIG. 13 is a front profile cross sectional view of FIG. 12, wherein the toilet tank jet air intake fan is shown.

FIG. 12 and FIG. 13 represent an alternate embodiment of the toilet facility whereby an air compressing jet-fan is incorporated into the tank so as to draw air into a chamber at a high velocity, then compressing it chamber 77, to be released into the closed toilet bowl cavity 1, to cause the content of the toilet bowl to be expelled therefrom under high air pressure. The jet-fan can be operated in a continuous manner, without the need for a holding chamber 77, thereby applying desirable thrust into the toilet bowl when closed, upon demand.

Figure 14:
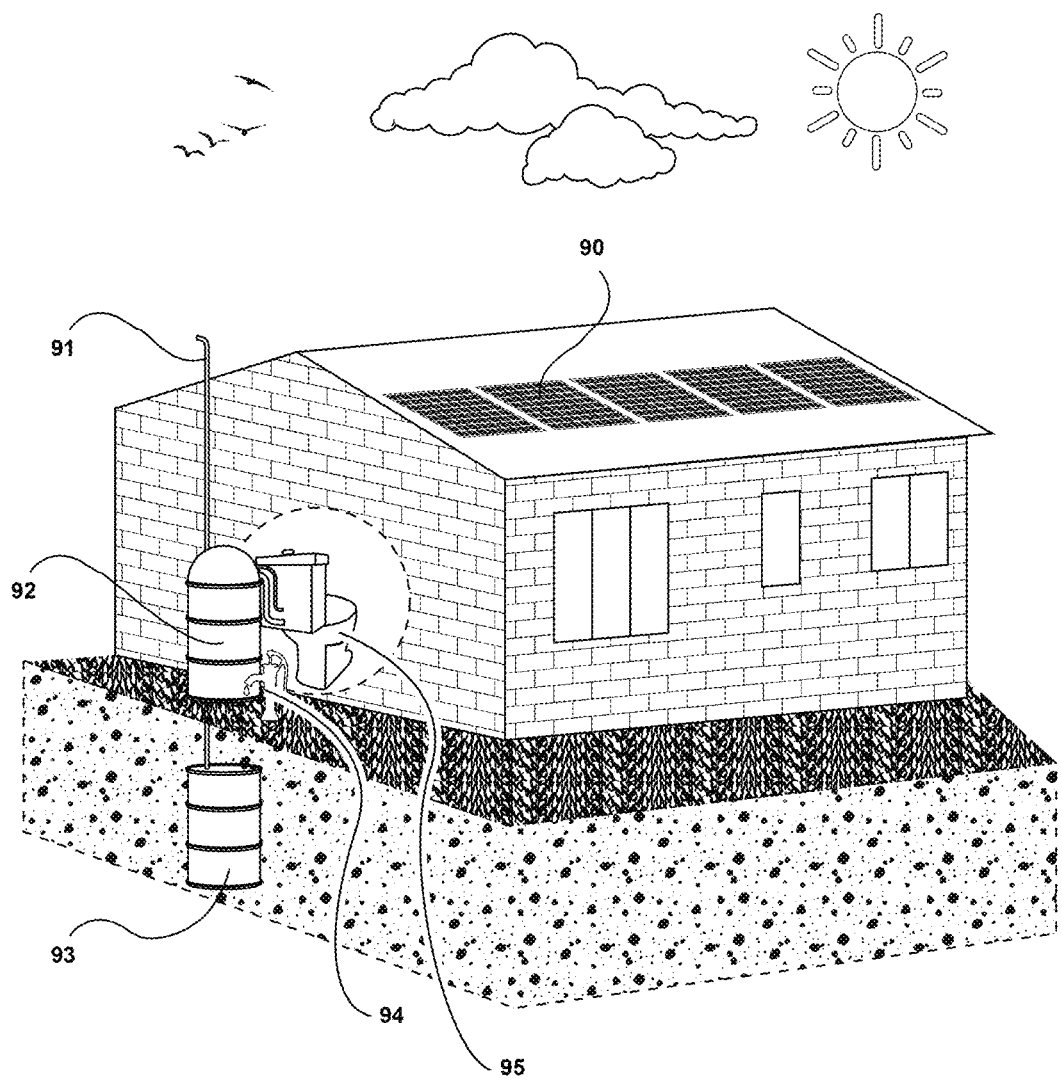
FIG. 14 is a partial cut away view of the toilet facility within a structure and a treatment facility located external to the structure.

FIG. 14 is a representation of the portable toilet system incorporated into a fixed structure such as home. Solar panels 90 are posited upon the roof of a home for optimal exposure to generate electricity. The toilet system may also use DC or AC current directly from the grid when built into a home. In a fixed structure integration, the discharged waste can be channeled to a central sewage treatment facility or a septic tank (not shown) instead of into the treatment facility 92. A water storage subterranean reservoir 93 is shown along with a manually operated water pump to extract water from the reservoir 93. The benefit of a low volume water flushing toilet will be realized, even if used with a conventional treatment facility installation such as a septic system.

FIG. 15 is a logic system flow diagram, "A" to "T" which govern the ideal operation for both the "toilet facility" and "treatment facility." Beginning with Letter "A", a flush option #1, #2 or #3 (for solid, liquid or both), controlled by a CPU is selected, which will close and lock the toilet bowl cover in an airtight manner. Compressed air and water is then released into the toilet bowl under pressure, causing the toilet bowl content to be expelled into the "treatment facility" by overcoming gravity. A CPU regulates the temperature and UV light use within the treatment facility to perform desired function. The treatment facility 8 may also be manufactured with a color or material that allows for natural absorption of thermal radiation from the sun, especially when installed in locations near the equator (below Tropic of Cancer and above Tropic of Capricorn).

During a flush cycle, water may be introduced under high pressure, when the compressed air 21 is released from the storage tank and enters the toilet bowl via 37, along conduit 22. The compressed air may be acquired directly from the atmosphere by an electronic air compressor 23 and stored, or by a jet propulsion pump as in FIG. 13, to generate positive air pressure upon demand. The toilet may also be flushed by compressed air alone, achieved manually by a foot (or hand compressor) in the event of no electrical power being available to operate the toilet system electronically, as shown in FIG. 9. The toilet may also be flushed by negative pressure, as in FIG. 3, which does not require the toilet cover to be in a closed and sealed position. Negative pressure is generated in the treatment facility when a vacuum is created within the waste collective system, to result in atmospheric air/pressure aiding in the flush cycle, with or without water.

A battery 24 is provided to store electrical energy from photovoltaic (PV) cells, for the operation of the air compressor and the dehumidifier, fan and condenser 25, hot coil 26 and cold coil 27. The hot air from the dehumidifier 30 is channeled to the treatment facility via conduit 9, which may be fabricated from flexible PVC pipe to provide insulation. Water is acquired from the condensation process and collected and stored into a reservoir 29. A subterranean reservoir is provided for excess water storage which may be used for agricultural purpose, FIG. 14 (93). Fecal and urine waste is discharged from the "J" trap 34 via conduit 10, along inner pipe of a suitable caliber 31.

The byproduct from the dehumidifier process is thermal radiation reaching at least 100 degrees C. The hot air is used to evaporate liquid from the treatment facility, since water boils and evaporates at this ideal temperature of 100 deg. C. To sterilize the content in the treatment facility and accelerate the evaporation of liquid, thermal radiation of at least 150 degrees C. is achieved using a heating coil, along with UV light (mainly for sanitization) which can be activated for a predetermined amount of time following each flush cycle, such as, for example, ten minutes.

Once a year or longer (depending on frequency of use and size of the "treatment facility"), the solid waste can be reused as fertilizer, discarded safely on land or into a river, or incinerated to ashes, using an accelerant such as kerosene, coconut oil, corn oil, palm oil or gasoline (all are readily accessible in the developing world and inexpensive in small quantity of one liter or less for the purpose desired. The "treatment facility" content can also be used as fuel additive for small to medium size industrial scale application such as fuel to generate electricity for a town or village.

At least one bidet sprout is provided, which may be shielded at the top to prevent contamination. The inner aspect of the toilet tank and the toilet bowl can be illuminated with any single or combination of colorful lights, derived from the three primary colors, to include a UV light to aid in sanitation of the toilet bowl when not in active use. Such spectacle can be readily viewed via the transparent cover when in the closed position, to illuminate the toilet bowl, to confirm that the flush cycle is effective and complete.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A solar powered toilet comprising:
    a treatment facility;
    a toilet facility designed to flush human waste with or without water into the treatment facility;
    a vacuum pump coupled to the treatment facility to generate negative pressure within the treatment facility to thereby extract waste from the toilet facility and into the treatment facility;
    photovoltaic cells for generating electricity to power at least the treatment facility and the vacuum pump;
    a dehumidifier, powered by the photovoltaic cells, to extract atmospheric water from humid air;
    at least one of a heating element powered by the photovoltaic cells and a coil of a condensing unit to evaporate water in the treatment facility; and
    a concave dome for the treatment facility housing the heating element and an ultraviolet lamp, to provide radiation, to evaporate and sanitize liquid and sanitize solids within the treatment facility.

2. The solar powered toilet of claim 1, having at least one bidet.

3. The solar powered toilet of claim 1, having a hydrophobic surface within a toilet bowl and a conduit linking the toilet bowl to the treatment facility.

4. The solar powered toilet of claim 1, wherein the photovoltaic cells are disposed on foldable solar panels.

5. The solar powered toilet of claim 4, configured to be portable.

6. The solar powered toilet of claim 1, further comprising a wireless communication means to diagnose malfunction of the system.

7. The solar powered toilet of claim 1, further comprising a subterranean water reservoir and a hand operated pump to retrieve water from the reservoir.

8. The solar powered toilet of 7, wherein the dehumidifier provides water to the subterranean water reservoir.

9. The solar powered toilet of claim 1, wherein the toilet facility has a plurality of toilet bowls, the waste from the plurality of toilet bowls all being treated in the treatment facility.

10. The solar powered toilet of claim 9, wherein the plurality of toilet bowls comprise four toilet bowls.

11. The solar powered toilet of claim 1, configured to be portable.

12. The solar powered toilet of 1, wherein the waste is flushed in a direction that is opposed to the direction of gravity.

* * * * *